April 15, 1969     A. VACCARO ET AL     3,439,133

INTERCONNECTED RELAY STATIONS

Filed Sept. 18, 1967

INVENTORS
Angelo Vaccaro
Harold F.E. Dixon
BY Johnson and Kline
ATTORNEYS

April 15, 1969     A. VACCARO ET AL     3,439,133
INTERCONNECTED RELAY STATIONS
Filed Sept. 18, 1967     Sheet 5 of 6

INVENTORS
Angelo Vaccaro
BY Harold F. E. Dixon

Johnson and Kline
ATTORNEYS

United States Patent Office 3,439,133
Patented Apr. 15, 1969

3,439,133
INTERCONNECTED RELAY STATIONS
Angelo Vaccaro, Port Washington, and Harold F. E. Dixon, Douglaston, N.Y., assignors to Columbia Controls Research Corporation, Glen Cove, N.Y., a corporation of New York
Filed Sept. 18, 1967, Ser. No. 668,320
Int. Cl. H01h 9/24
U.S. Cl. 200—1                                    14 Claims

ABSTRACT OF THE DISCLOSURE

A plurality of interconnected relay stations with each station having at least a movable pole member engageable with a contact member with one of the members being formed to include a flexible strip of conducting material and the other a segment of electrical conducting material and in which the contact member of one relay station is connected to be engaged by the pole member of the other by an integral extension of the contact member.

---

In many systems it has been found desirable to form an electrical path between an input and any one of a plurality of outputs with the selection of the one output being under the control of electrical signals. One heretofore suggested structure, sometimes called a relay tree, has included a plurality of relays with each having at least one pole and two contacts for the pole with each contact of one relay being connected to a different one of a pair of poles of a subsequent relay whose contacts in turn may each be connected to a different one of a plurality of poles of a subsequent relay. The contacts of the last relay in the chain constitute the output of the system.

The contacts and poles of each relay are generally individual members which are connected to terminals with the terminals of the relays being connected by a separate conducting part, such as a piece of wire. Thus a plurality of individual parts and/or connections may be required to effect the forming of the tree. While the expense and probability of error in connecting are generally acceptable when only a few poles and contacts are to be connected together, as the number of connections increase the completed device is rendered complex and increasingly expensive to manufacture but also it becomes extremely subject to having errors introduced during its manufacture.

It is accordingly an object of the present invention to provide a plurality of connected relay stations in which the relay stations are formed so that connections between a number of stations may be economically and reliably made during the fabrication of the relay.

Another object of the present invention is to achieve the above object by having the connection between a contact member of one relay station and the pole member of the next station be an integral extension of the contact member.

A further object of the present invention is to provide a relay station which may have one or more pole members and contact members with both members being economically fabricatable and accurately assemblable by their being formed from either flexible sheet conducting material or electrically conducting segments adhered to the surface of an electrically insulating base.

In carrying out the present invention, there is provided a plurality of relay stations with each station including at least one pole member and generally two contact members. The pole member is mounted for movement to engage at one position one contact member and at its other position the other to effect an electrical path from the pole member to the engaged contact member. The position of the pole member may be determined by the energization of non-energization of a solenoid or other actuating means which translates an electrical signal into a determined position of the pole member. The contact member of one station is connected to a pole member of the next station, with the next station in turn having a pair of contact members selectively engageable with its pole member. Thus the path traverses the pole member and one contact member of the first station to the pole member and one of the contact members of the next station and so forth with there being as many stations as needed to provide the required number of outputs. Moreover, at each station there may be one or a plurality of pole members, each of which has its own contact members with which it is engageable. In a binary relay tree for example, the number of pole members in each subsequent station constitutes a binary exponential series.

In the embodiments of the invention hereinafter disclosed, each pole and contact member includes either a flexible metal arm shaped from electrical conducting sheet metal or a segment of electrically conducting material that is formed as an integral layer on an electrically insulating base, the latter being the usual structure of printed circuit boards. In one group of embodiments, a segment constitutes the contact member and the flexible arm the pole member. In another group of embodiments, the conducting segment constitutes the pole member and the finger the contact member. In both groups, however, the connection from the contact member of one relay station to the pole member of the other consists of an integral extension of the contact member. Thus if the contact member is an arm, it is shaped so as to extend to be engaged by both the pole member of its relay station and the pole member of the next relay station. If, as in the other group, the contact member is a segment, it is also shaped to extend to be engaged by the pole members of both its own and the next relay station.

All the pole members of each relay station are mounted for movement at least between a first and a second position wherein each pole member effects an electrical path with a first contact member of an electrical path with a second contact member respectively. In all embodiments shown, there are actuating means for receiving an electrical signal and causing the pole members to assume one or the other positions with all pole members of one relay station being simultaneously moved. By the selection of the position of the pole members for each of the relay stations, an electrical path may thus be produced from an input to a selected one of a plurality of outputs by the use of electrical signals that activate the relay stations.

Other features and advantages will hereinafter appear.

In the drawing.

FG. 3 is an enlarged portion of an elevation of the embodiment of FIG. 1.

Figure 15:
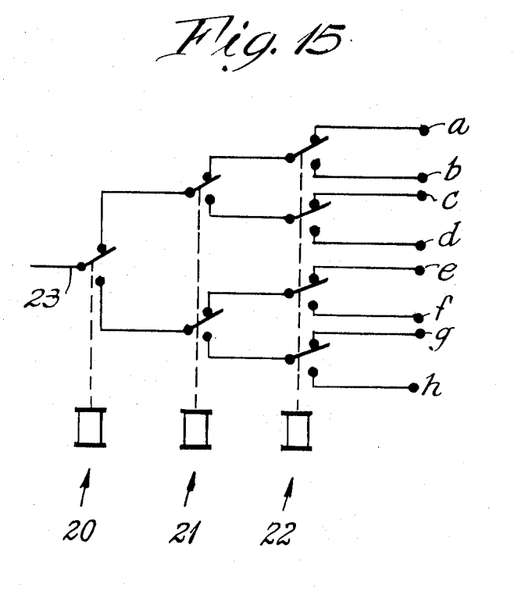
FIG. 15 is an electrical schematic diagram of the interconnected relay stations of the embodiments shown.

Referring to the drawing, each of the embodiments herein specifically described is interconnected to achieve the same electrical result, namely a relay tree having eight outputs, whose electrical schematic diagram is shown in FIG. 15. While the invention may be utilized with two or more relay stations, the description thereof is drawn for convenience and clarity to just three relay stations 20, 21 and 22 with the stations having one, two and four pole members respectively and two, four and eight contact members respectively. The pole member 23 of the relay station 20 constitutes the one input to this relay station and which as the stations form a relay tree, is the input of the interconnected relay stations. The output of the stations consists of any one of a plurality of contact members $a$ through $h$ of relay station 22. In the solid line position of the pole members, it will be understood that the input 23 is connected to the output $a$ and thus forms an electrical path therebetween. By energization of any one or all of the relay stations 20–22, the input 23 can be caused to be connected to any other one of the outputs $a$ through $h$. For example, if just the relay station 22 is energized, then the output $b$ is connected to the input 23 by the pole members of relay station 22 shifting to their other positions; if just the relay station 21 is energized, the output $c$ is connected to the input 23; and if just the relay station 20 is energized, the output $e$ is connected to the intput 23, etc.

It will accordingly be understood that the specific embodiment of the invention shown herein constitutes in effect a relay tree for enabling an electrical path to be formed between any one of a plurality of outputs and an input by the application of a proper electrical signal to the relay stations. In order to minimize the disclosure it will be understood that if desired more than three relay stations may be used if the number of outputs is greater than the eight shown. For example, with four relay stations sixteen outputs are provided, five relay stations thirty-two outputs, etc. provided each of the stations has two contact members for each pole member and the pole members increase in number according to a binary exponential series. Moreover, while a relay tree has been shown, it will be understood that the present invention is not to be solely limited thereto but may be used where other types of interconnections between relay stations is desired as the basic concept is the interconnections between relay stations and not to any specific plan of the interconnections.

Figure 1:
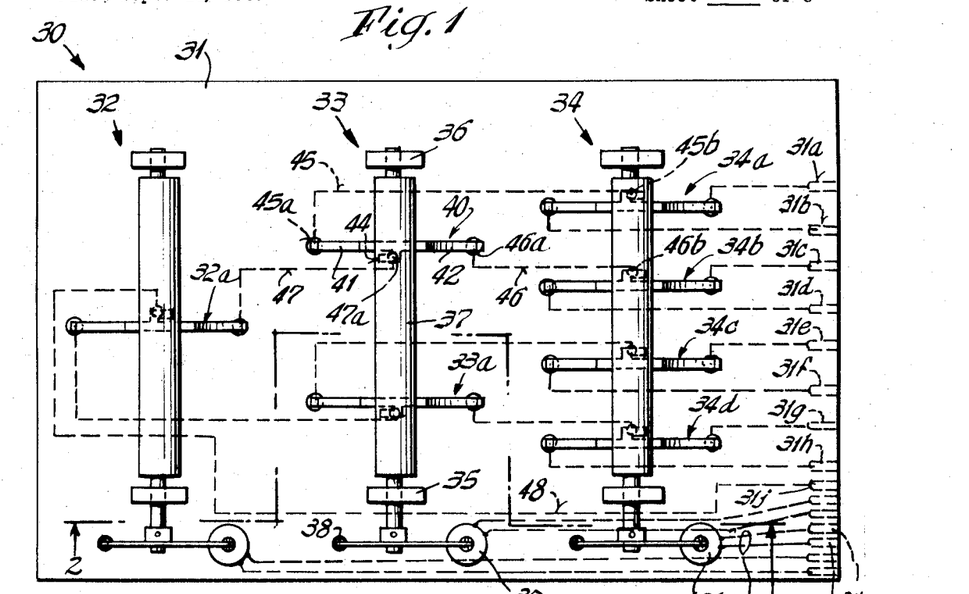
FIGURE 1 is a plan view of one embodiment of the present invention utilizing flexible fingers as pole members and conducting segments as contact members for three sequentially connected relay stations.
Figure 2:
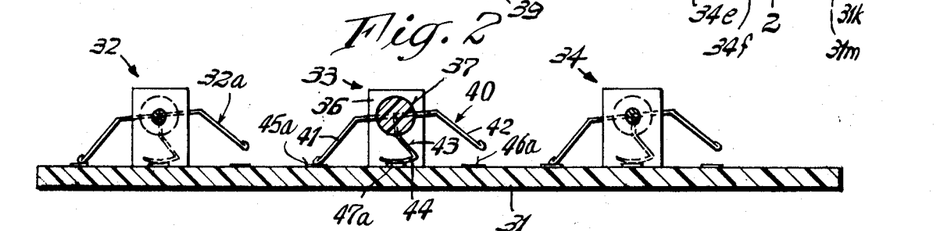
FIG. 2 is a section taken on the line 2—2 of FIG. 1.

The embodiment of the invention shown in FIG. 1 is generally indicated by the reference numeral 30 and includes three relay stations electrically connected in the manner shown in FIG. 15. The interconnected relay stations 30 include a board 31 on which printed circuit segments are formed with the extent and direction of each segment being indicated by a dash line. The board and segments are formed in the usual manner of constructing a printed circuit board with the board being formed of electrically insulating material and the segments being of electrically conducting material adhered to the surface of the board.

Figure 3:
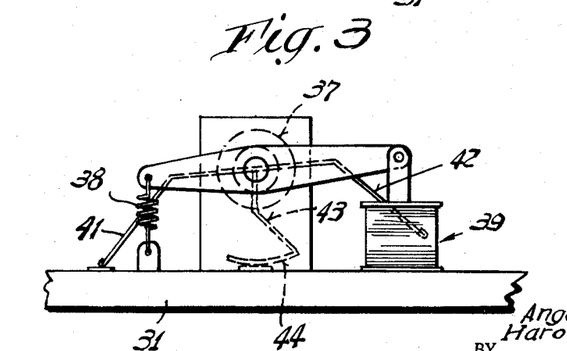

The three relay stations are indicated by the reference numerals 32, 33 and 34 and each is essentially identical in construction. Referring specifically to the intermediate relay station 33, there is provided a pair of supports 35 and 36 mounted on the top surface of the board 31 which support, for pivotal movement, an actuating bar 37. The bar (FIG. 3) is urged by a spring 38 to one rotational position and by the energizing of a solenoid 39 to its another position with the former effecting a counter-clockwise movement and the latter effecting a clockwise movement. In the absence of energization of a solenoid 39, the spring 38 controls the position of the actuating bar to hold it in the position shown.

Figure 4:
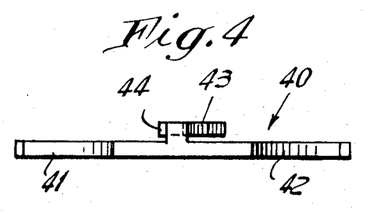
FIG. 4 is a plan of a pole member, somewhat enlarged.

As the relay station 33 is electrically identical to the relay station 21, it accordingly has two pole members 40, each of which is identical in construction. A plan view of a pole member is shown in FIG. 4 and it consists of a one-piece stamping or electrically conducting sheet metal that is preferably flexible and formed to have a downwardly extending left-hand finger 41 and a downwardly extending rightward finger 42 together with a downwardly extending median finger 43 that terminates in an arcuate end portion 44. The pole members 40 may be mounted on the actuating bar 37 in any convenient manner as for example by segmenting the actuating bar to clamp the pole members therebetween, or by riveting. The bar is formed of electrically insulating material that is substantially rigid to thus prevent conduction between the spaced apart pole members.

The printed circuit board 31 is formed to have a segment 45 which has one end 45a positioned beneath the finger 41 when the solenoid is not energized and another segment 46 positioned to have an end 46a located to be engaged by the finger 42 of the pole member 40 when the solenoid is energized. The connection from a contact member of the first relay station to the pole member 40 is through a segment 47 having an end 47a that is positioned beneath the arcuate end portion 44 of the pole member 40 so as to be in continuous electrical engagement at both posiltions of the actuating bar. The segment 45 extends to have its another end 45b located beneath a finger of a pole member 34a of the relay station 34 to be in continuous electrical contact therewith. Similarly the segment 46 has another end portion 46b terminating beneath to be in engagement with the arcuate end portion of another pole member 34b of the relay 34.

The relay 34 includes two more pole members 34c and 34d which are connected as shown by electrically conducting segments to the contacts associated with the pole member 33a of the relay station 33. Both of the pole members 34a and 40 of the relay station 33 are electrically connected by conducting segments to the two contact members of the relay station 32 which are engaged by the pole member 32a in the manner shown. Each of the pole members is of the same configuration as the pole member 40 and each station has an actuating bar similar to the bar 37 that is positioned by its relay or spring.

As the board 31 is a printed circuit board, it is preferably formed with connector segments 31a–31h for providing outputs similar to outputs $a$ through $h$ that are shown in the schematic diagram. The input may be a segment 48 that includes a connector segment 31j and constitutes the connection to the pole 32a. Moreover, if desired, as shown by the solenoid 34e, segments may connect the wires 34f of the solenoid 34e to other conductor segments 31k and 31m of the printed circuit board with the solenoids of the other two stations being similarly connected to conductor segments. In this manner, all exterior connections to the interconnected relay station may be a single detachable edge connector of the type designed for connection to printed circuit board conductor segments.

It will be appreciated that in use the relay stations shown in FIGS. 1–4 will function in a manner described in connection with the schematic diagram, FIG. 15, and thus a connection between the input 31j and any one of the outputs 31a–31h is made by energization or nonenergization of the solenoid of each station.

Figure 5:
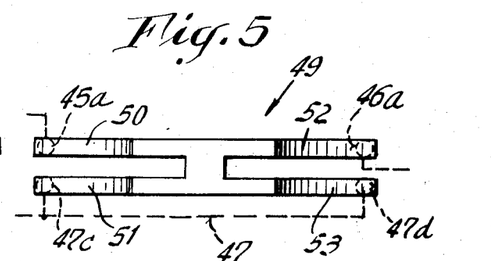
FIG. 5 is a detail plan of an alternate construction of a pole member and its contact members.

Referring to FIG. 5, there is shown a plan of an alternate structure of a pole member which is generally indicated by the reference numeral 49 and is stamped of sheet metal to have the shape shown. In this embodiment rather than have a depending arcuate end portion 44, each side of the pole member is formed with two parallel, depending fingers 50 and 51 and 52 and 53. The fingers 50 and 52 correspond to the fingers 41 and 42 of the pole member 40 while the fingers 51 and 53 take the place of the end portion 44. When using the pole member 49 the segment 47, as diagrammatically shown, would be shaped to have instead of one terminating end 47a, two terminating ends 47c and 47d, each being positioned to be engaged by the fingers 51 and 53 respectively, depending upon the position of the actuating bar 37 that supports the pole member. The other connections to the pole member heretofore described in connection with pole 40, namely ends 45a and 46a remain the same. Thus in a relay tree using this species of a pole member, with its solenoid not being energized, current is conducted from the previous relay station to end portion 47c, finger 51 and through the pole member to finger 50 which engages segment end 45a for conduction to the following relay station pole member. In the other position of the pole member 50, the path is through the end 47d, fingers 53 and 52 to segment end 46a.

In the above described embodiments of the invention it will be appreciated that when either of the pole members 40 or 49 is used in the stations that each is identical in construction. Each pole member is formed of flexible electrically conducting thin sheet metal which may be easily stamped to the desired form and positioned in actuating bars that may be also similar in construction except for the number of pole members carried by each bar. The connection between one relay station and the subsequent relay station consists of a contact member that is formed as an integral conducting segment to accordingly eliminate any further connections, joints or parts required for forming the paths between the relay stations.

Figure 6:
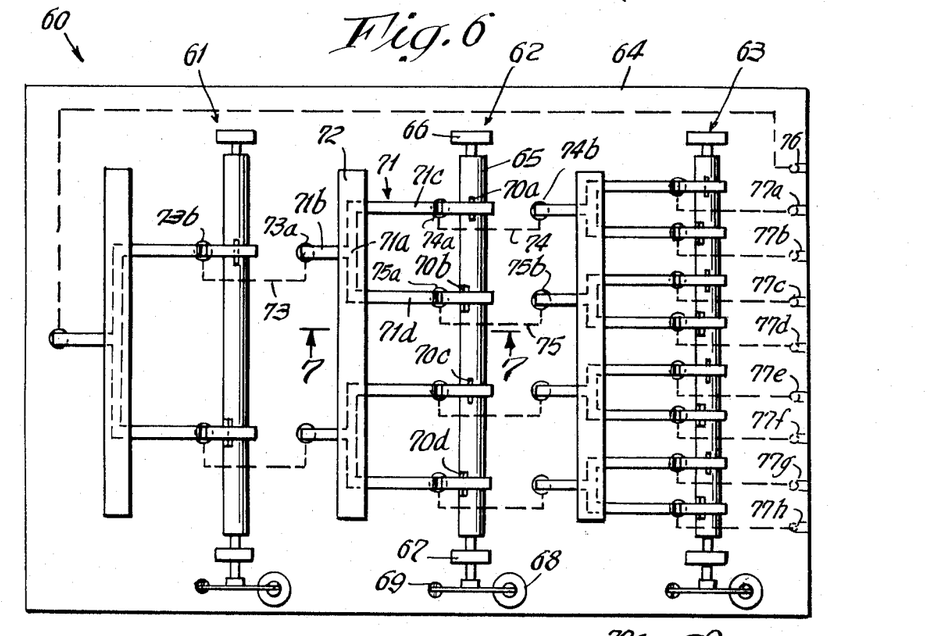
FIG. 6 is a plan of another species of the embodiment of the invention shown in FIG. 1 in which the pole members are formed of flexible fingers and the contact members of conducting segments.
Figure 8:
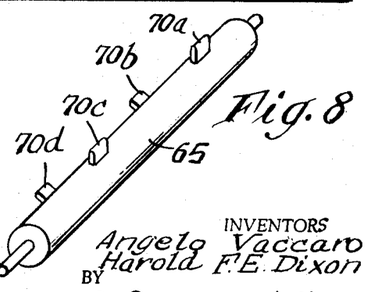
FIG. 8 is a perspective view of the actuator employed in one relay station of the embodiment shown in FIG. 6.

Referring to FIG. 6, there is shown a further species of the invention in which the contact members are again formed of conducting segments and the pole members are formed of one piece, flexible metal stampings. This embodiment, generally indicated by the reference numeral 60, also has three relay stations 61, 62 and 63 that are mounted on a printed circuit board 64. Rather than mounting the pole members so that all fingers are moved as a unit, in this embodiment, each of the two fingers of the pole member that are engageable with the contact member is individually controlled. The actuating means for relay station 62 consists of an actuating bar 65 (FIG. 8) mounted on bearing supports 66 and 67 and pivotally moved by a solenoid 68 and a spring 69. The bar includes spaced projections 70a, 70b, 70c and 70d with alternate projections 70a and 70c, and 70b and 70d both being aligned along the axis of the bar but with the projections 70b and 70d being rotationally displaced an arcuate length from the other projections which is sufficient to provide actuation between the two end positions of the bar as determined by the solenoid and spring.

Figure 7:
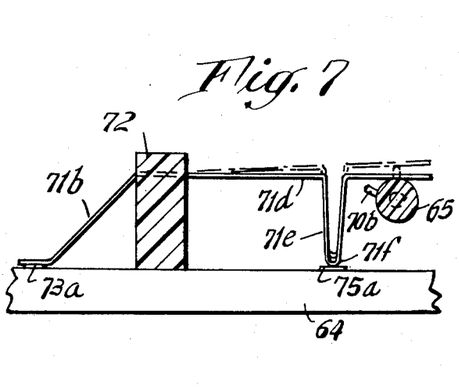
FIG. 7 is a section, somewhat enlarged, taken on the line 7—7 of FIGS. 6 showing details of construction.

A pole member 71 of the relay 62 is mounted on a fixed block 72 of insulating material in any convenient manner as by rivets (not shown) extending through its central portion 71a. The pole member is an integral one-piece stamping that is shaped to have a leftwardly extending finger 71b and at the ends of the central portion 71a, rightwardly extending fingers 71c and 71d. The projections and the fingers 71c and 71d are positioned to have a finger aligned with a projection, as, for example, finger 71c and projection 70a, finger 71d and projection 70b. Each finger 71c and 71d is shaped in cross-section as shown in FIG. 7 to have a U-shaped portion 71e that includes a bight 71f. The pole member 71 is mounted on the block 72 and the depth of the bight is such that the normal position of the finger is for the bight 71f to engage an electrical segment on the printed circuit board opposite thereto with sufficient tension to effect an assured electrical connection.

It will be clear that in the deenergized position of the solenoid 68 the projection 70a will engage the end of finger 71c and cause the same to be flexed (as shown in dotted lines FIG. 7) to lift the bight above and away from its segment. On the other hand, the finger 71d which does not engage its projection 70b in this position of the bar will maintain its normal position of engaging its segment. For the opposite condition, i.e. energization of solenoid 68, the actuating bar 65 is pivoted clockwise permitting finger 71c to become disengaged from projection 70a and effect electrical contact with its associated segment while the finger 71d is flexed by the projection 70b and becomes disengaged from its associated segment. The movement of the fingers 71c and 71d occurs through their length as the block 72 does not move.

The finger 71b is formed to be continually urged downwardly against its associated segment and maintains continuous contact therewith. The contact member for the finger 71b is the end 73a of a segment 73 whose other end 73b is engaged by a finger of a pole member of the first relay station 61. A segment 74 has an end 74a positioned to engage the bight of finger 71c and another end 74b positioned to be engaged by a finger correponding to the finger 71b of a pole member of the relay station 63. Similarly a segment 75 has an end 75a positioned to be engaged by the finger 71d at one end and another end 75b engageable with a finger corresponding to the finger 71b of another pole member of the relay station 63.

Each of the pole members for each relay station is identical. While the same shape pole member may be used on other relay stations, this specific embodiment of the invention has the pole members vary somewhat in shape, as by the length of the central portion 71a. Thus each pole member has three fingers, two of which are selectably engageable by operation of the actuating bar 65 while the third is maintained in continuous engagement with a portion of a conducting segment formed on the printed circuit board 64.

As in the other embodiment hereinbefore described, the outputs may be connected to the usual conducting segments on the end of a printed circuit board for connection to a connector of conventional design. The circuit functions in the same manner as heretofore described in that operation of the various actuating bars will provide an electrical path between an input 76 and any one of a selected plurality of outputs 77a–77g.

In the above described species, the contact members and connections between pole members of the relay stations have consisted of conducting segments formed on printed circuit boards while the pole members have been formed of unitary sheet metal stampings. In the embodiment hereinafter described, the structure of the members is reversed and thus the contact members are made of unitary sheet metal stampings while the pole members are formed of conducting segments which may be formed in the same manner on an insulated base as is well known in the printed circuit board art.

Figure 9:
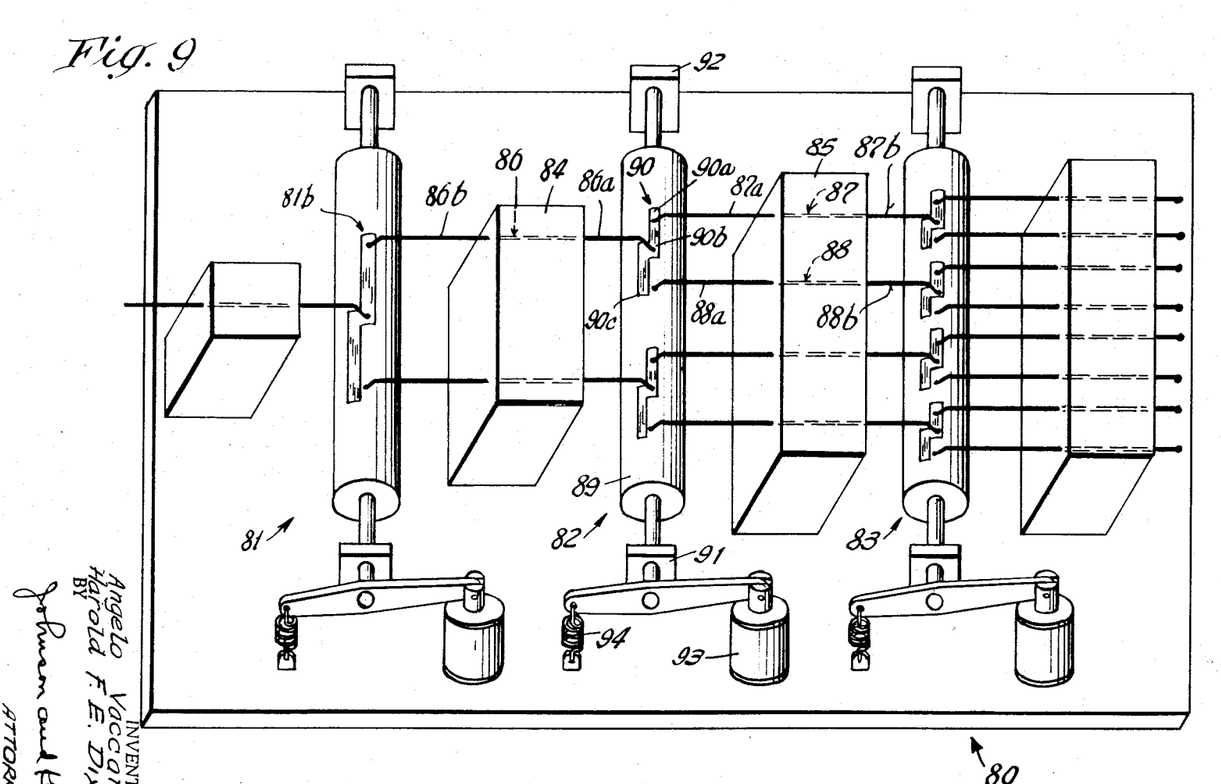
FIG. 9 is a perspective view of another embodiment of the present invention in which the pole members are formed of conducting segments and the contact members are formed of flexible sheet metal stampings.

Referring to FIG. 9, the interconnected relay stations are generally indicated by the reference numeral 80 and consist of three stations 81, 82 and 83. Specifically, the middle relay station 82 includes a first block of insulating material 84 positioned between it and the relay station 81 and a second block 85 of similar material mounted between it and relay station 83. Extending from the block 84 is an end portion 86a of a contact member 86 while extending from the block 85 in the opposite direction are end portions 87a and 88a of contact members 87 and 88. The portions 86a, 87a and 88a terminate substantially axially with a cylinder 89 and are flexed to be tensioned against the surface thereof.

The cylinder 89 is formed of insulating material and has a conducting segment 90 formed thereon with the segment having the shape shown. The cylinder 89 is mounted in supports 91 and 92 for rotational movement by a solenoid 93 and a spring 94. In the position shown which is the deenergized position of the solenoid 93, the end portion 87a engages an offset end 90a of the segment 90 while the end 88a does not engage said segment and hence bears against the periphery of the cylinder 89. Furthermore the end 86a engages the intermediate portion 90b of the segment. Thus an electrical path is effected through the contact member 86, the pole member 90 and the contact member 87.

For effecting an electrical path between the contact members 86 and 88, the solenoid 93 is energized, rotating the cylinder 89 clockwise a rotational distance sufficient to place another offset end portion 90c in engagement with the end of contact arm 88 while the same movement separates the offset portion 90a and the end 87a. It will be appreciated that the longer portion 90b of the pole member 90 is arcuately longer than the offset ends 90a and 90c to be long enough to maintain engagement with the contact member 86a at all operable positions. Preferably the three ends of the contact members are made to be in alignment with the axis of rotation of the cylinder 89 for ease in designing the shape of the segment and fabrication.

Each of the other relay stations has one or more similar pole members and thus the contact arm 86 may extend through the block 84 and have an end 86b rest in engagement with the conducting segment 81b constituting a pole member of the relay 81. Similarly, the ends 87b and 88b extend to engage different pole members of relay station 83 in the same manner that end portion 86a engages central portion 90b of pole member 90. In this form of the invention, the pole members of each relay, there being one, two and four in number, are each formed as a conducting segment on an electrically insulating base. It has been found that such segments may be economically and easily made in the same manner that a conducting segment is made on a printed circuit board by well known fabrication techniques even though the surface is arcuate. Moreover, while the pole members are shown as different shapes, it is considered to be within the scope of the present invention for them to be identical and the ends of the fingers bent to mate therewith. Also, if desired, the same cylinder having many pole members thereon may be used at each relay station with the number of pole members utilized in each slot depending on the number of contact members, thus standardizing the cylinder. The fingers, such as the finger 86, may consist merely of a length of flat sheet metal with sufficient resiliency to provide some compressiveness against the pole member to assure adequate contact.

Figure 10:
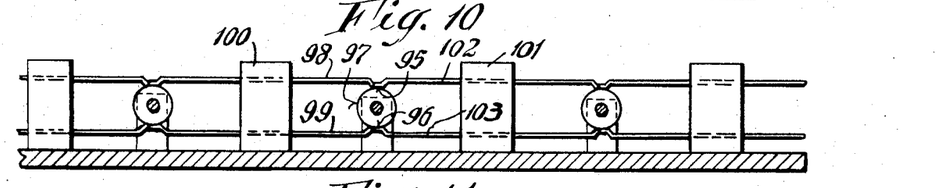
FIG. 10 is a side section of a modification of the species shown in FIG. 9.

Shown in FIG. 10 is a modification of the species of the invention shown in FIG. 9 which enables more pole members to be formed on a cylinder without increasing the length of the cylinder and the difficulties inherent with a long cylinder. This species has pole members similar in shape and construction to the pole member 90 formed on both the upper surface 95 and a lower surface 96 of a cylinder 97. Vertically spaced contact members 98 and 99 may be secured in the same block 100 to engage the segments formed on the surfaces 95 and 96 with each functioning in the same manner as contact 86. Extending towards the cylinder 97 from a block 101 on the opposite side are contact arms 102 and 103 which similarly engage the pole members formed on opposite sides of the cylinder to function in the same manner as the contact members 87 and 88.

Figure 11:
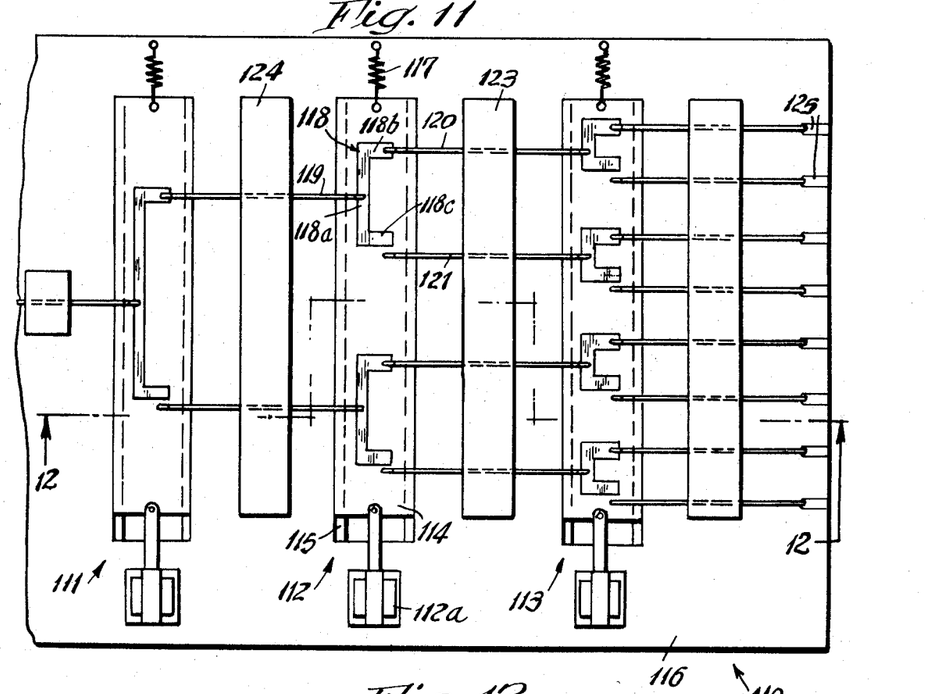
FIG. 11 is a plan of another embodiment of the invention in which the pole and contact members are formed of the same material as the members shown in the FIG. 9 embodiment.

In FIG. 11 there is shown another embodiment similar to FIG. 9 with the difference in structure being that the pole members are moved linearly rather than rotatably. To this end, the embodiment is generally indicated by the reference numeral 110 and includes relay stations 111, 112 and 113. Referring specifically to the relay station 112, it includes a solenoid 112a that is connected to a plate 114 mounted for sliding movement in a slot 115 formed in a base 116. A spring 117 engages the other end of the plate 114 for normally urging the same to the solid line position shown which is the deenergized position of the relay station. The plate 114 and slot 115 are provided with cooperating tongue and groove edges 114a and 116a respectively for supporting same for solely longitudinal movement.

Each of the pole members of the relay 112 consists of conducting segments having the shape shown and preferably the plate 114 is formed of electrically insulating material such as used in printed circuit boards so that the pole members may be formed in the same manner that the conducting segments are formed on a printed circuit board. Referring to a pole member 118, it is substantially U-shaped in construction having a bight 118a that is engaged by a contact arm 119. One leg 118b is engaged by an end of a contact member 120 while another leg 118c is engageable with an end of a contact member 121. The ends of the contact members 120 and 121 are spaced apart in a direction of movement of the plate 114 a distance which is greater than the distance between the legs 118b and 118c so that in the deenergized condition of the relay station 112, the contact member 120 will engage the leg 118b and the contact 121 not engage its leg 118c. For movement caused by energization of the solenoid 113, the contact member 121 will engage its leg 118c while the contact member 120 will be free of its leg 118b. The bight 118a is sufficiently long to maintain engagement at all positions of movement with the contact member 119 thereto.

Figure 12:
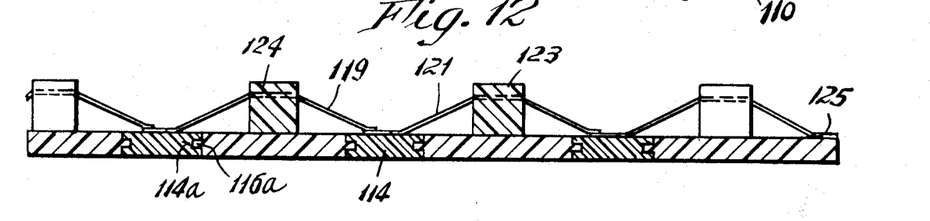
FIG. 12 is a section of the embodiment shown in FIG. 11 taken substantially on the line 12—12 of FIG. 11.

As shown in FIG. 12, the contact members 120 and 121 are mounted in an insulating block 123 while the contact 119 is mounted in an insulated block 124. Preferably each of the contact members is angularly bent as shown in order to provide a resilient compression of their ends against the conducting segments. Similarly as in the previous embodiment shown in FIG. 9, the contact members extend through their blocks to be in continuous engagement with the pole members of an adjacent relay with the ends of the contact members extending from the the ends may be bent to engage connector segments relay 113 constituting the output of the circuit. As shown ends may be bent to engage connector segments 125 if desired to enable a printed circuit board edge connector to be used to form a connection to the relay station.

Figure 13:
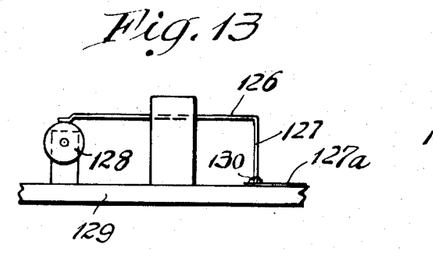
FIG. 13 is a sectional detail of a contact member of the last relay station for the species shown in FIGS. 9 and 11 which enables the use of an edge connector for a printed circuit board.

An alternate structure for connecting an end of a contact member to a connector segment is shown in FIG. 13 wherein a contact member 126 has its end 127 opposite to the end engageable with a cylinder 128, bent down and fastened to a conducting segment 127a of a printed circuit board 129 as by a solder connection 130. Such a construction may be employed in both embodiments of the invention to have all connections thereto made by the conventional printed circuit board edge connector.

Figure 14:
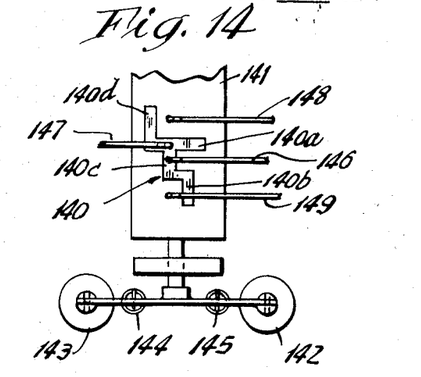
FIG. 14 is a detail of pole and contact members which may be employed in the embodiment shown in FIG. 9 for providing three contact members in a relay station.

Shown in FIG. 14 is a detail of a pole member formed by a conducting segment and contact members which may be employed in the relay station shown in FIG. 9 for providing instead of the heretofore described two contact members selectively engageable by a pole member, three contacts engageable thereby. The pole member is generally indicated by the reference numeral 140 and may consist of a conducting segment secured on the surface of a cylinder 141 formed of insulating material to have the shape shown. The member 140 has a relatively long portion 140a that extends transversely to the axis of the cylinder 141, and integral increasingly peripherally offset portions 140b, 140c and 140d. The cylinder 141 is connected to be actuated by a pair of solenoids 142 and 143 with balancing springs 144 and 145 such that both solenoids deenergizing the springs place the cylinder in its intermediate position wherein a contact member 146 engages the intermediate portion 140c of the pole. A contact member 147 from a previous relay station is engageable with the long portion 140a to thus effect connection between the contact members 147 and 146. With the solenoid 142 energized the cylinder 141 is rotated clockwise to effect connection between a contact member 148 and the portion 140d with the contact member 147 maintaining its engagement with the portion 140a. Similarly for energization of the relay 143 a connection is effected by the pole member 140 between a contact member 149 and contact member 147 by use of the portions 140b and 140a.

It will be understood that the pole member described in FIG. 14 may be used as the pole member for any one of the pole members heretofore described if it is desired to use a tertiary system instead of a binary system. Naturally, there will be one more contact member for each pole member.

Figure 16:
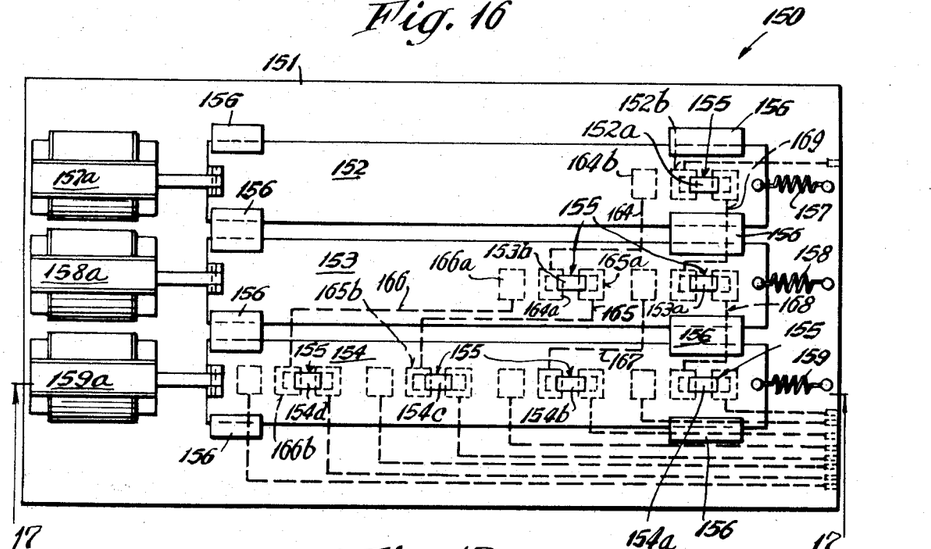
FIG. 16 is a plan of another embodiment of the first group in which the pole member is a flexible finger and the contact member conducting segments.
Figure 17:
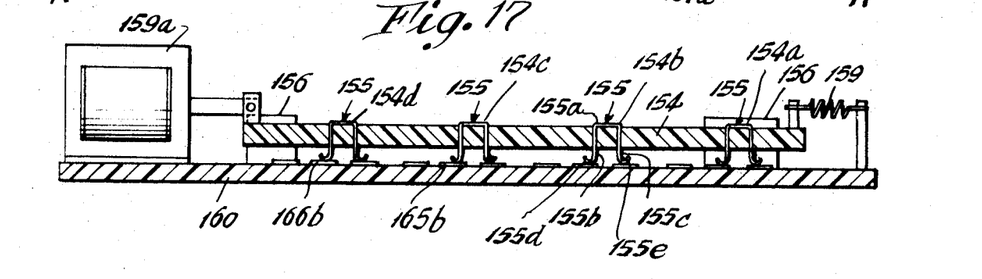
FIG. 17 is a section taken on the line 17—17 of FIG. 16.

FIGS. 16 and 17 disclose a further embodiment of the first group in which the pole members are formed of a unitary piece of flexible sheet metal and the contact members formed of conducting segments. This embodiment is generally indicated by the reference numeral 150 and includes a base 151 that supports for sliding movement three pole plates 152, 153 and 154 as this embodiment also has three relay stations. Each pole plate is formed of a sheet of rigid insulating material, such as plastic and carries one or more pole members 155 with the plate 152 having one pole member, the plate 153 having two pole members and the plate 154 having four pole members.

Upstanding from the base are a plurality of grooved supports 156 into which the edges of the plates are supported for sliding movement. Each plate is individually movable between a left and a right position. The plate 152 has a spring 157 normally urging the plate to the right position and a solenoid 157a which when energized moves the plate to the left position. Plate 153 has a similar spring 158 and a solenoid 158a connected to it while plate 154 has a spring 159 and a solenoid 159a connected thereto.

All pole members carried by the plates are identical and referring to FIG. 17, a pole member 155 is shaped from a thin strip of flexible metal to be somewhat U-shaped having a bight portion 155a, depending legs 155b and 155c and curved end portions 155d and 155e. The member is supported in its pole plate in any desired manner as by the legs passing through apertures in the plate with the curved ends projecting beyond the lower surface of the plate.

The base plate is a printed circuit board 160 on which contact members are formed as insulating segments. There are three contact members for each pole member, a left, intermediate and right so that in the right position of a pole plate, each pole member will engage the intermediate and right contact members to form a connection therebetween. In the solenoid energized position, the left position, each pole member will engage the left contact member and the intermediate contact member. By thus controlling the position of the pole plate, electrical connection is made between the intermediate contact member and either the left or right contact member.

The pole piece 153 has its pole member 153b contactable as shown with an end 164a of a conducting segment 164 as its intermediate contact member and an end 165a of a conducting segment 165 at its right position. The segment 164 has its other end 164b constitute the left contact member of the pole member 152a while the other end 165b of the segment 165 constitutes the intermediate contact that cooperates with a pole member 154c. Another segment 166 has an end 166a which constitutes the left contact for the pole member 153a while its other end 166b constitutes the intermediate contact for the pole member 154d. Similarly segments 167 and 168 have ends which constitute the left contact member for pole member 153a and intermediate contact member for pole member 154b and the right contact member for pole member 153a and the intermediate contact member for the pole member 154a. The intermediate contact member for the pole member 153a is a segment 169 that constitutes for the right contact member for the pole member 152a.

As in the other embodiments, the left and right contact members of the last relay station may extend to the edge of the board to enable connection thereto by an edge connector. Similarly the intermediate contact 152b of the pole member 152a may be likewise extended to be the input to the first relay station. The solenoids may also be connected to conducting segments if desired.

In each of the heretofore described embodiments the actual surface of the pole member that engages the surface of the contact member has been set forth as being either the end of a conducting segment or the end of a piece of sheet metal. The contact surface characters of these materials may not be as satisfactory as that obtainable from precious metals such as gold, silver, etc. and thus it is considered to be within the scope of the present invention to use contact buttons or plated surfaces wherever desired or required to form the actual contacting surfaces.

It will accordingly be appreciated that there has been disclosed an interconnected relay station that includes a plurality of individually operable relay stations. Each relay station has at least a pole member and a pair of contact members with an electrical path being established from the pole member to one or the other of the contact members by controlled energization of the relays. The stations are interconnected so that a contact member of one station is connected to the pole member of a subsequent station with the contact members of the last station constituting the output of the interconnected stations if they are connected as a relay tree.

For achieving the objects of the invention, the contact members are formed as either an integral metal piece or as a conducting segment and thus do not require any additional connection or parts to enable their being in the electrical path from one station to the next. When the contact members are formed of a metal piece, the pole members are formed of an integral segment and conversely when the contact members are formed of an integral segment the pole members are formed of an integral metal piece. In this manner both parts are capable of being economically and easily fabricated and assembled to interconnect the relay stations.

We claim:

1. A plurality of interconnected relay stations having an input and a plurality of outputs for electrically connecting the input to a selectable one of the outputs by selective operation of the stations comprising at least three relay stations, each of said stations including a pole member, means mounting the pole for movement between a first and second position, a first contact member engageable by the pole at its first position, means for moving the pole member to its first position to connect the pole member to the contact member, and in which one of said members is formed as an integral metal piece and the other of said members is formed of a segment of electrically conducting material integrally secured on a surface of an electrically insulated base.

2. The invention as defined in claim 1 in which the contact member of a first relay station is connected to a pole member of a second relay station, said connection being an integral extension of the contact.

3. The invention as defined in claim 1 in which there is a second contact member formed identically to the first contact member, said moving means moving said pole member to its second position to cause engagement between the pole member and the second contact member.

4. The invention as defined in claim 3 in which a second relay station has two pole members, the first contact member of the first relay station is connected to one pole member of a second relay station, the second contact member of the first relay station is connected to the other pole member of the second relay station and in which each connection of the contact member to the pole member is an integral extension of the contact member.

5. The invention as defined in claim 1 in which the relay stations are sequentially connected with the number of pole members of each being related by a binary exponential series in which each relay station has at least twice as many contact members as it has pole members and in which each connection between a pole member and a contact member consists of a unitary piece.

6. The invention as defined in claim 1 in which each pole member is a unitary piece of flexible metal, each contact member is a conducting segment, there are at least two contact members for each pole member and means for moving the pole member to engage one or the other contact member.

7. The invention as defined in claim 6 in which the last named means includes a pivoted lever movable between two arcuate positions, the pole member is mounted on said lever to have arms extending from each side of the lever and a contact member is positioned on either side of the lever coincident with the pole member.

8. The invention as defined in claim 6 in which the last named means includes a pivoted lever having spaced projections, each pole member has a pair of fingers with each finger positioned to be engaged by a projection, and in which alternate projections are aligned and intermediate projections aligned but arcuately spaced from the alternate projections.

9. The invention as defined in claim 6 in which the last named means includes a plate mounted for sliding movement between a first and second position, each of said pole members being mounted on the plate and having spaced apart contacting portions, in which there are two contact members spaced apart along the path of movement of the pole member and in which there is an intermediate contact member positioned between the two contact members, said pole member being engageable with the intermediate contact member and one of the two contact members.

10. The invention as defined in claim 1 in which pole members are formed of a unitary conducting segment, means for moving the pole members between a first and a second position, each of said pole members having an intermediate portion and two end portions, the contact members are formed of unitary pieces of flexible metal and in which a contact member is engageable with the intermediate portions of the pole member at both positions, another contact member is engageable with an end portion only at the first position and another contact member is engageable with another end portion only at the second position.

11. The invention as defined in claim 10 in which the means for moving a pole member includes a slidable plate on which the pole members are unitarily formed and on which each pole member is a substantially U-shaped segment with the bight portion constituting the intermediate portion.

12. The invention as defined in claim 10 in which the means for moving the pole member includes a pivoted lever on which the pole member is unitarily formed and in which the segment forming the pole member has its end portions transversely disposed along the pivot axis and arcuately displaced with respect to each other.

13. The invention as defined in claim 12 in which the conducting segment includes an intermediate portion arcuately disposed between the two end portions and engageable with a third contact member.

14. The invention as defined in claim 1 in which the relay stations are formed on a base, a plurality of conducting connectors formed adjacent one edge of said base, and means interconnecting the connectors with the contact members of the third relay.

References Cited

UNITED STATES PATENTS

| | | | |
|---|---|---|---|
| 3,233,050 | 2/1966 | McKee | 200—1 |
| 3,255,318 | 6/1966 | McKee | 200—1 |

ROBERT K. SCHAEFER, *Primary Examiner.*

H. O. JONES, *Assistant Examiner.*